9711X
A. Davidson,
Washing Machine,
Patented June 11, 1836.
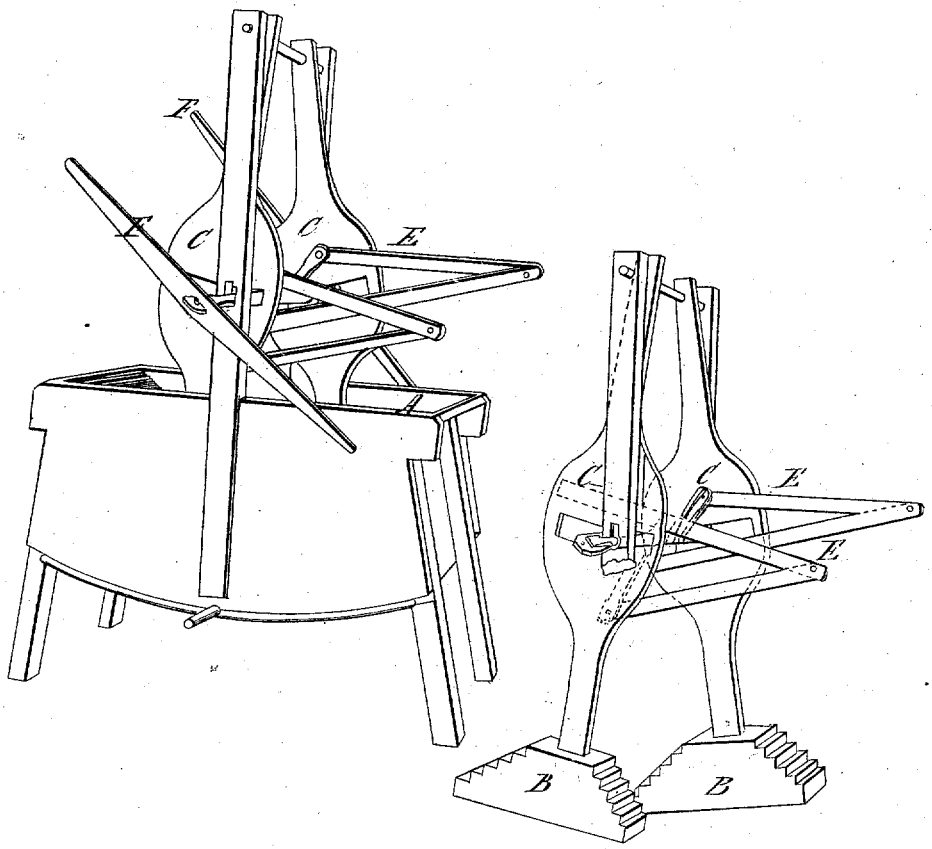
N. PETERS, PHOTO-LITHOGRAPHER, WASHINGTON, D. C.

9711X

June 11, 1836

Amory Davidson of Littleton Massachusetts

Letters Patent

The Schedule referred to in these Letters Patent and making part of
the same containing a description in the words of the said Amory David
son himself of his improvement in the machine for Washing clothes Be it known that I Amory Davidson of Littleton in the County
of Middlesex and State of Massachusetts have invented a new and
useful improvement in the machine for washing clothes which is
described as follows. This Machine consists of a water tight box whose
bottom is curved to a segment of a circle of a radius a little greater
than the radius of the circle in which the beaters move. The ends
are inclined inwardly and at one end there is an inclined fluted
wash board. The whole is supported on four legs. In the bottom
of the Box is a hole and plug for drawing off the water. At the sides
of the Box are two standards to the ends of which are suspended the beaters
by an axle. The Beaters consists of blocks of Pine wood curved on the
bottom and cut into steps on top. The arms by which they are suspen
ded are made flat with oblong mortices cut in them to permit them to play
over the shaft passing through the standards to which the power is applied
The arms are [illegible] into this shaft connected to the beaters by connecting rods
attached to the ends of arms fastened to and projecting from the beaters.
On the end of the shaft are arms or levers by which the machine is opera
ted. The soap and warm water being put into the Box with the clothes
to be washed the shaft is [illegible] to the right and left by the handles.
this motion causes the beaters to have a vibrating motion by which means
the clothes are driven to the ends of the Box and by the peculiar shape of
its ends and a corresponding shape in the beaters the clothes are kept con
stantly turning over and receiving a new stroke from the beaters in a fresh
place till they are completely cleansed. But should any of the pieces
require further cleaning it can be done on the fluted board by hand
What I claim as my invention and which I desire to secure

9711 X

June 11, 1836 by Letters Patent consists in the machine for washing clothes as before described.

Witnesses
Wm P. Elliot
B. R. Merrell

Ashley Davidson (Patented 11 June 1836)

(416 words)

Drawing